United States Patent [19]

Nishioka et al.

[11] Patent Number: 5,652,428

[45] Date of Patent: Jul. 29, 1997

[54] METHOD OF USING SCANNING PROBE MICROSCOPE ALLOWING CLEANING OF PROBE TIP IN AMBIENT ATMOSPHERE

[75] Inventors: Tadashi Nishioka; Takao Yasue, both of Hyogo, Japan

[73] Assignees: Mitsubishi Denki Kabushiki Kaisha, Tokyo; Ryoden Semiconductor System Engineering Corporation, Hyogo, both of Japan

[21] Appl. No.: 589,515

[22] Filed: Jan. 22, 1996

[30] Foreign Application Priority Data

Apr. 4, 1995 [JP] Japan .................. 7-104855

[51] Int. Cl.$^6$ .............................. H01J 37/28; G01B 7/34
[52] U.S. Cl. ........................ 250/307; 250/306; 73/105
[58] Field of Search ........................ 250/307, 306; 73/105

[56] References Cited

U.S. PATENT DOCUMENTS

| 5,038,034 | 8/1991 | Fujita | 250/306 |
| 5,132,533 | 7/1992 | Kawase | 250/306 |

FOREIGN PATENT DOCUMENTS

| 4337402 | 11/1992 | Japan | G01B 7/34 |
| 5-164512 | 6/1993 | Japan . | |
| 5164512 | 6/1993 | Japan | G01B 7/34 |

OTHER PUBLICATIONS

Hans–Werner Fink, Mono–Atomic Tips for Scanning Tunneling Microscopy, IBM J. Res. Develop., vol. 30, No. 5, Sep. 1986, pp. 460–465.

U. Staufer et al, Investigation of Emitter Tips for Scanning Tunneling Microscope–Based Microprobe Systems, J. Vac Sci. Technol. B, vol. 9, No. 6, Nov./Dec. 1991, pp. 2962–2966.

D.K. Biegelsen et al, Ion Milled Tips for Scanning Tunneling Microscopy, Appl. Phys. Lett., vol. 50, No. 11, Mar. 1987, pp. 696–698.

T. Tiedje et al, Tip Contamination Effects In Ambient Pressure Scanning Tunneling Microscopy Imaging of Graphite, J. Vac. Sci Technol. A, vol. 6, No. 2, Mar./Apr. 1988, pp. 372–375.

M. Tomitori et al, Elaboration and Evaluation of Tip Manipulation of Scanning Tunneling Microscopy, J. Vac. Sci. Technol. A, vol. 8, No. 1, Jan./Feb. 1990, pp. 425–428.

Uchida, H. et al., "Single–atom manipulation on the Si(111)7*7 surface by the scanning tunneling microscope," *Surface Science*, ISSN 0039–6028, May 1993, vol. 287–288, p. 1056.

Tiedje, T. et al., "Tip contamination effects in ambient pressure scanning tunneling microscopy imaging of graphite", *Journal of Vacuum Science and Technology: Part A*, vol. 6, No. 2, Mar. 1988–Apr. 1988, New York:U.S.

"In Situ Sharpening of Atomic Force Microscope Tips", IBM Technical Disclosure Bulleting, vol. 38, No. 2, Feb. 1995, p. 637.

*Primary Examiner*—Jack I. Berman
*Attorney, Agent, or Firm*—Lowe, Price, LeBlanc & Becker

[57] ABSTRACT

A method of use of a scanning probe microscope includes the step of mounting a probe to a scanning probe microscope in ambient atmosphere, the step of drawing on a surface of a standard sample by two-dimensionally scanning while keeping constant a tunnel current under feedback control of a distance between a standard sample and the probe, the step of applying pulse voltage between the probe and the standard sample while two-dimensionally scanning, with feedback control stopped at each scanning point, the step for obtaining drawn image of the surface of the standard sample again, comparing the obtained drawn image with the drawn image obtained in the step of drawing on the surface of the standard sample thereby determining cleanness of the probe, the step of repeating the step of pulse application and the step of determination of cleanness until the probe is cleaned, the step for replacing the standard sample by a sample for measurement after cleanness of the probe is confirmed, and the step of drawing.

11 Claims, 14 Drawing Sheets

METHOD OF USING SCANNING PROBE MICROSCOPE ALLOWING CLEANING OF PROBE TIP IN AMBIENT ATMOSPHERE

BACKGROUND OF THE INVENTION

Field of the Invention

The present invention relates to a method of use of a scanning probe microscope including the step of cleaning the probe for inspection of a scanning probe microscope in ambient atmosphere, which probe is already processed to have the final shape of a probe. More specifically, the present invention relates to a method of use of a scanning probe microscope including preparation of a probe tip for microscopic inspection such as inspection of atomic image.

A method of cleaning a conductive probe used in a scanning probe microscope (hereinafter referred to as SPM) such as a scanning tunneling microscope (STM) processed to have a shape of a probe by chemical polishing or mechanical processing, and preparing a probe enabling inspection of atomic level has been disclosed, for example, in (1) Hans-Werner Fink; IBM J. Res. Develop., Vol. 30, No. 5, pp. 460–465 (1986), U. Staufer, L. P. Muray, D. P. Kerns, and T. H. P. Chang; J. Vac. Sci. Technol. B, Vol. 9, No. 6, pp. 2962–2966 (1991), (2) D. K. Bielgelsen, F. A. Ponce, and J. C. Tramontana; Appl. Phys. Lett., Vol. 50, No. 11, pp. 696–698 (1987), (3) T. Tiedje, J. Varon, H. Deckman, and J. Strokes; J. Vac. Sci. Technol. A, Vol. 6, No. 2, pp. 372–375 (1998), (4) M. Tomitori, N. Hirano, F. Iwasaki, Y. Watanabe, T. Takayanagi, and O. Nishikawa; J. Vac. Sci. Technol. A, Vol. 8, No. 1, pp. 425–428 (1990), and (5) Japanese Patent Laying-Open No. 5-164512.

In the method of preparing a probe disclosed in Article (1), a probe for inspection formed of tungsten (W) is used as a tip of a field ion microscope. (FIM) or a field electron emission microscope (FEEM). Absorbed substance such as organic substance on the surface of tungsten is removed by ions of helium (He), neon (Ne) or argon (Ar), change in the FIM image or the FEEM image caused by disorption or surface diffusion of W atoms at the surface is monitored, and based on the results of monitoring, an optimal probe used for SPM is prepared.

FIG. 14 schematically shows the principal of this method. A high electric field is applied to a probe for inspection and based on an FIM image generated by ions 3 of gas atmosphere such as He or Ne generated at a high potential surface 4, removal of substance absorbed by the surface of the probe 1, disorption of atoms constituting the probe 1 such as W atoms and the state of surface diffusion are monitored. The high electric field is continuously applied until FIM image which corresponds to one atom at the tip of the probe 1 is obtained, and in this manner, cleaning and preparation are performed.

In the method of preparing a probe disclosed in Article (2), ion.milling is used for cleaning and preparation, by which tungsten oxide ($WO_x$) as an impurity generated at the probe for inspection formed of W is removed.

FIG. 15 schematically shows the principal of this method. Accelerated ions 3 of Ar, for example, are directed obliquely at a prescribed angle θ to the tip of the probe 1 for inspection formed of W. The surface 1a of the probe which may be formed by the impurity $WO_x$ is removed by milling, so that the inner portion 1b of the probe is exposed and the tip of the probe 1 is made sharp.

In the method of preparing a probe disclosed in Article (3), nickel (Ni), platinum (Pt) or gold (Au) is provided to cover the probe for inspection formed of platinum (Pt)-iridium (Ir) which has already been processed to have the shape of a probe, by back scattering in which ion collision and sputtering take place simultaneously. In this manner, contamination by an organic substance, for example, is removed.

FIG. 16 schematically shows the principal of this method. Probe 1 for inspection is put in a vacuum chamber 5, and contamination at the tip of probe 1 for inspection is removed by ion collision by an ion beam 8 entering from an ion source 6 through a neutralizer 7 partially neutralizing the ions to the vacuum chamber 5, and at the same time, the tip of probe 1 for inspection is covered by Ni, Pt or Au which is the material of the target electrode 9, by back scattering of atoms constituting the target electrode 9.

In the method of preparing a probe disclosed in Article (4), a probe for inspection formed of Pt—Ir which has already been processed to have the shape of a probe is heated in an ultra high vacuum, and thereafter the tip of the probe is cleaned and prepared by field evaporation.

In the method of preparing a probe disclosed in Article (5), the following components are arranged in a vacuum chamber: a probe for the STM, a sample table movable relative to the probe and allowing positioning of a sample to be measured and a standard sample for evaluating contamination of the probe at portions where tunneling current from the STM probe is provided, and a scanning tunnel microscope body including manipulator means for cleaving the standard sample or a heater. By heating or by applying electric field to the probe, tip of the probe is cleaned, and by measuring tunnel barrier of the probe, whether or not the probe has been cleaned is determined.

However, these conventional methods of cleaning and preparation of the probe for inspection suffers from the following problems.

Namely, in the conventional method, large scale and expensive apparatuses are necessary, such as field ion microscopy, field electron emission microscope, ion milling apparatus, back scattering apparatus and ultra high vacuum apparatus. Further, these conventional methods require troublesome operation of moving the cleaned and prepared probe 1 for inspection to the SPM apparatus.

FIG. 17 is a flow chart showing the conventional method of cleaning and preparation disclosed in Article (1) in which FIM image is used. The flow chart will be briefly described.

First, in a vacuum chamber including FIM apparatus, an SPM probe is mounted (S41).

Thereafter, the vacuum chamber is exhausted to a back ground pressure (generally $10^{-10}$, Pa) allowing FIM measurement (S42).

Inert gas such as He, Ne or the like is introduced and a high electric field is applied to the probe (S43), and the FIM image is monitored (S44).

Application of the voltage is continued until absorbed substance is removed from the surface of the probe by electric field evaporation and an FIM image corresponding to such a state in that only one atom exists at the probe tip is obtained (S45) (the probe tip in this state will be hereinafter referred to as a mono-atomic tip).

When it is determined that the probe tip has become a mono-atomic tip, the vacuum chamber is purged (S46).

The probe is removed from the vacuum chamber and attached to a scanning probe microscope (S47). Scanning (drawing) on a surface of the standard sample is performed (S48), the state of preparation of the probe tip is determined based on the obtained drawn pattern (S49), and if preparation is not sufficient, the same steps from the mounting of probe to the vacuum chamber are repeated (S50).

If preparation is satisfactory, the standard sample is replaced by the sample to be measured (S51), and drawing and processing are performed (S52).

As described above, the conventional methods require large scale vacuum apparatus, and in addition, time necessary for preparation is long. Further, in the conventional methods, the probe is not directly checked by the SPM image itself, but indirectly checked based on the FIM image or the like. Therefore, precise and sure cleaning and preparation were difficult.

SUMMARY OF THE INVENTION

An object of the present invention is to provide a method of cleaning and preparation of a probe for inspection, which is inexpensive and simple, allowing determination of a state of the probe by SPM image itself, inspection of a sample surface in atomic level, measurement of electrical properties and processing such as moving of atoms.

Briefly stated, the method of the present invention includes the steps of: mounting a conductive standard sample of which atomic arrangement pattern is known, and a probe to be cleaned to a scanning probe microscope in ambient air; applying a constant voltage to the standard sample and the probe and two-dimensionally scanning the position of the probe relative to the standard sample, while a distance between the standard sample and the probe is feedback-controlled so that a tunnel current is held at a constant value, thereby obtaining a topography of a prescribed region on the standard sample surface; two-dimensionally scanning the position of the probe relative to the standard sample while performing feedback control, stopping feedback control every time a prescribed steps of scanning is done in the two-dimensional scanning, applying at least once a constant pulse voltage for a prescribed time period to the standard sample and the probe, and scanning the next step with feedback control resumed, so as to two-dimensionally scan the probe in a prescribed region; applying the same voltage as in the step of obtaining topography of the standard sample to cause the same tunnel current to flow while the probe is two-dimensionally scanned under feedback control, comparing the topography thus obtained of a prescribed region with the topography obtained of the standard sample, and based on the known atomic arrangement pattern, determining cleanness of the probe tip; repeating the step of applying pulse voltage and the step of determining cleanness until it is determined that the probe tip is cleaned; after it is determined that cleaning is completed, replacing the standard sample by the sample to be measured, at the set position; and obtaining topography in a prescribed region of the sample to be measured while performing feedback control.

According to another aspect of the present invention, the method includes the steps of: placing a conductive standard sample which is smaller than a sample to be measured and of which atomic arrangement pattern is known, near an inspection surface of the sample to be measured; mounting the sample to be measured with the standard sample arranged nearby and the probe to be cleaned to a scanning probe microscope in an ambient atmosphere; a first step of drawing for two-dimensionally scanning the position of the probe relative to the sample to be measured while applying a constant voltage between the sample to be measured and the probe while performing feedback control of the distance between the sample to be measured and the probe so that tunneling current is kept constant, thereby obtaining a topography of a prescribed region on the surface of the sample to be measured; scanning the position of the probe relative to the standard sample under feedback control to obtain a topography of a prescribed region on the surface of the standard, sample; two-dimensionally scanning the position of the probe relative to the standard sample under feedback control, stopping feedback control at every scanning of a prescribed number of steps during two-dimensional scanning, applying at least once a prescribed pulse voltage for a prescribed time period between the standard sample and the probe, resuming feedback control and scanning the next step, thereby two-dimensionally scanning the probe in a prescribed region; two-dimensionally scanning under feedback control while applying the same voltage as applied in the step of obtaining topography of the standard sample to cause the same tunneling current, comparing thus obtained topography of the prescribed region with the topography of the standard sample surface, and determining cleanness of the probe tip by the comparison with the known atomic arrangement pattern; repeating the step of pulse application and the step of determining cleanness until it is determined that the probe tip becomes clean; after it is determined that cleaning is completed, a second step of drawing to obtain topography of a prescribed region of the sample to be measured under feedback control; comparing the topography obtained in the first step of drawing and the topography obtained by the second step of drawing, to see whether the probe tip becomes clean; and obtaining a topography of a prescribed region under feedback control on the sample to be measured.

Therefore, a main advantage of the present invention is that auxiliary means such as vacuum apparatus is not necessary, since the method is based on the steps of mounting, and drawing/processing in ambient atmosphere. Further, cleaning and preparation of the probe are performed referring to a conductive standard sample of which atomic arrangement pattern on the surface has been known, and hence whether or not a mono-atomic tip is obtained can be readily confirmed. Thus a probe suitable for inspecting sample to be measured in atomic level can be obtained.

Another advantage of the present invention is that the position of the probe can be readily switched from the sample to be measured to the standard sample by a simple operation of applying an offset voltage of XY scanning voltage, since the standard sample is set juxtaposed with the sample to be measured.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS (1) Brief Description of Structure and Operation of the Apparatus Prior to the description of the embodiments of the scanning probe microscope in accordance with the present invention, the structure and operation of the scanning probe microscope used for measurement will be briefly described.

Here, a scanning tunnel microscope (STM) will be described as an example of a scanning probe microscope.

Figure 12:
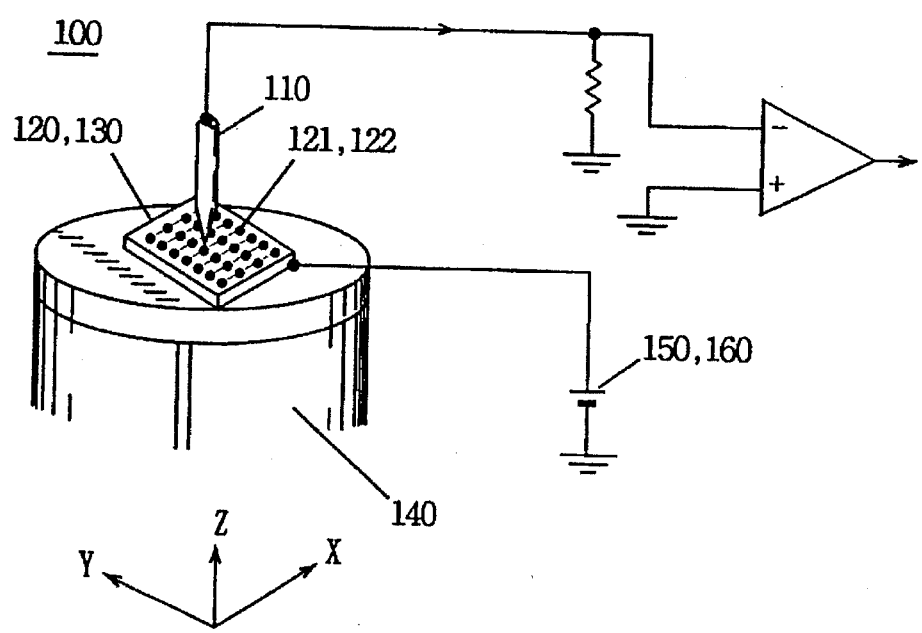
FIG. 12 is a schematic block diagram showing a structure of a main portion of the scanning probe microscope.

FIG. 12 is a schematic perspective view showing a main portion of an STM apparatus.

In an ambient atmosphere, a sample 120 to be subjected to STM measurement is fixed on a sample stage consisting of a cylindrical piezoelectric element 140.

Between probe 110 and sample 120, a prescribed bias voltage is applied by a bias power source 150. Though there is a distance between probe 110 and sample 120, a tunnel current flows therebetween, which is amplified by a preamplifier 200.

Figure 13:
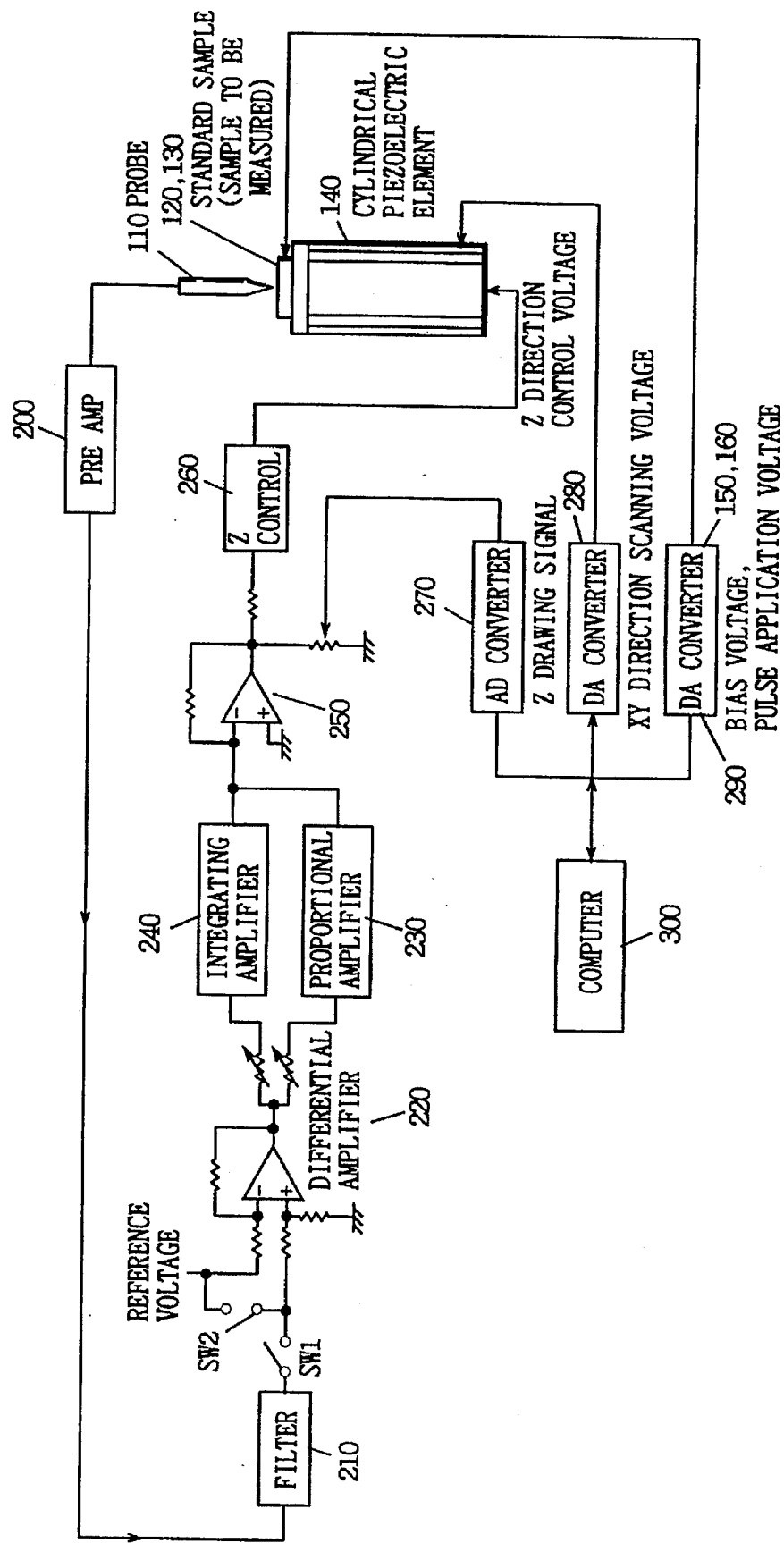
FIG. 13 is a block diagram showing the whole structure of a scanning probe microscope.
Figure 14:
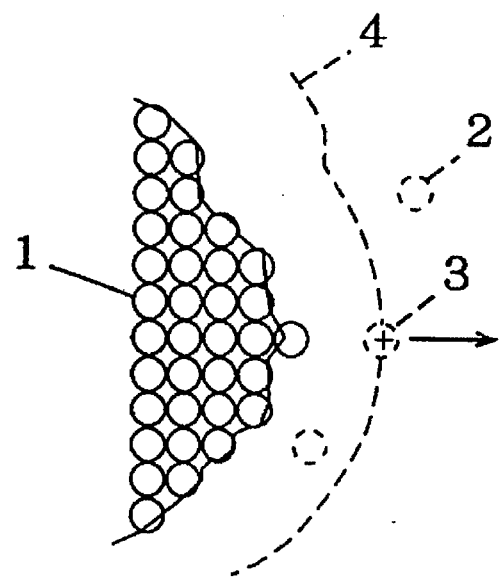
FIG. 14 is a schematic diagram showing the principal of a first prior art example.
Figure 15:
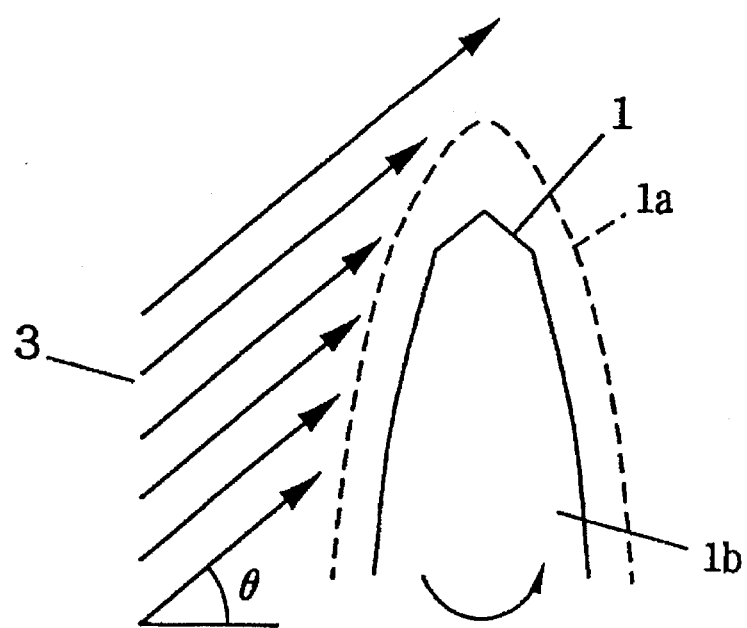
FIG. 15 is a schematic diagram showing principal of a second prior art example.
Figure 16:
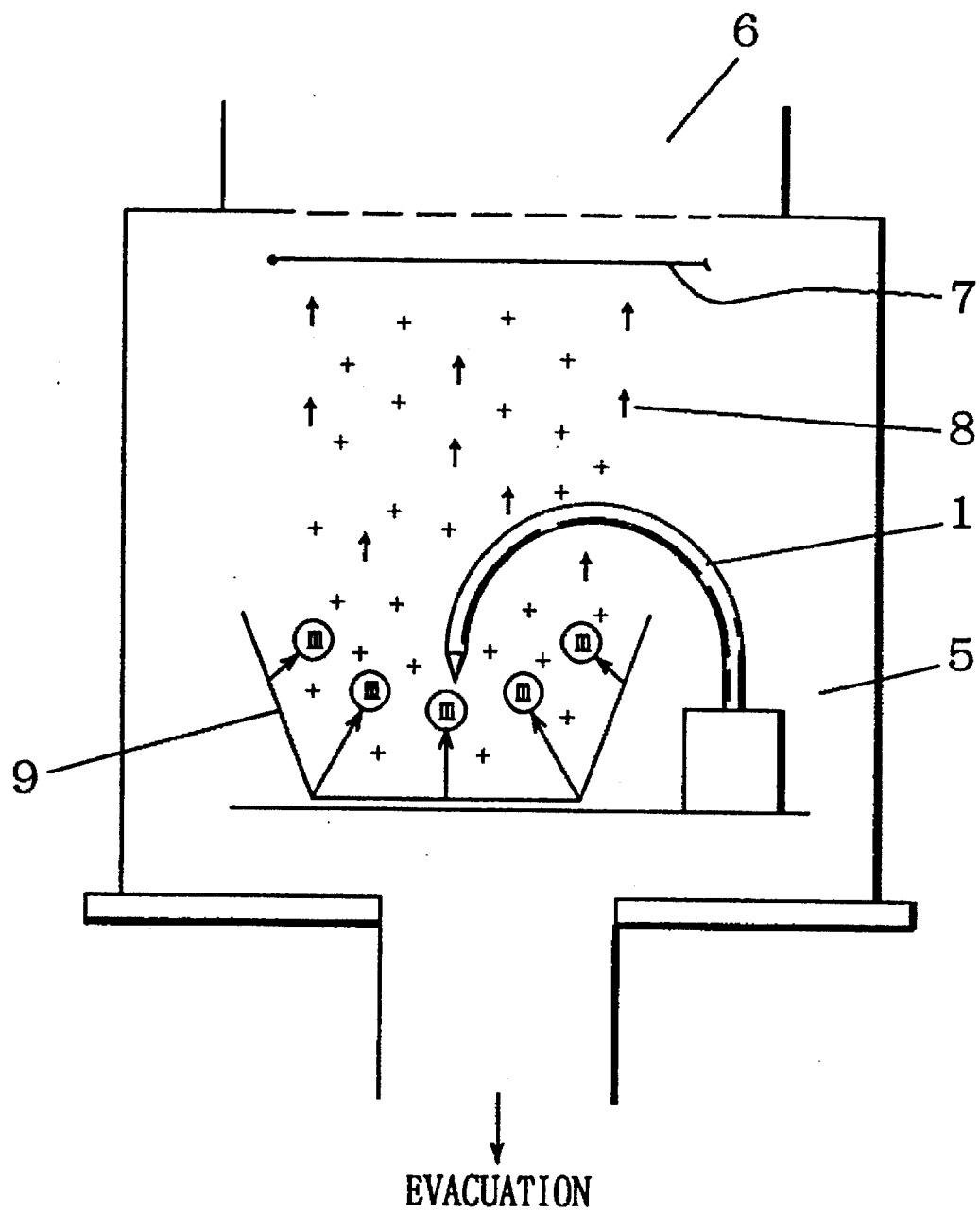
FIG. 16 is a schematic diagram showing principal of a third prior art example.
Figure 17:
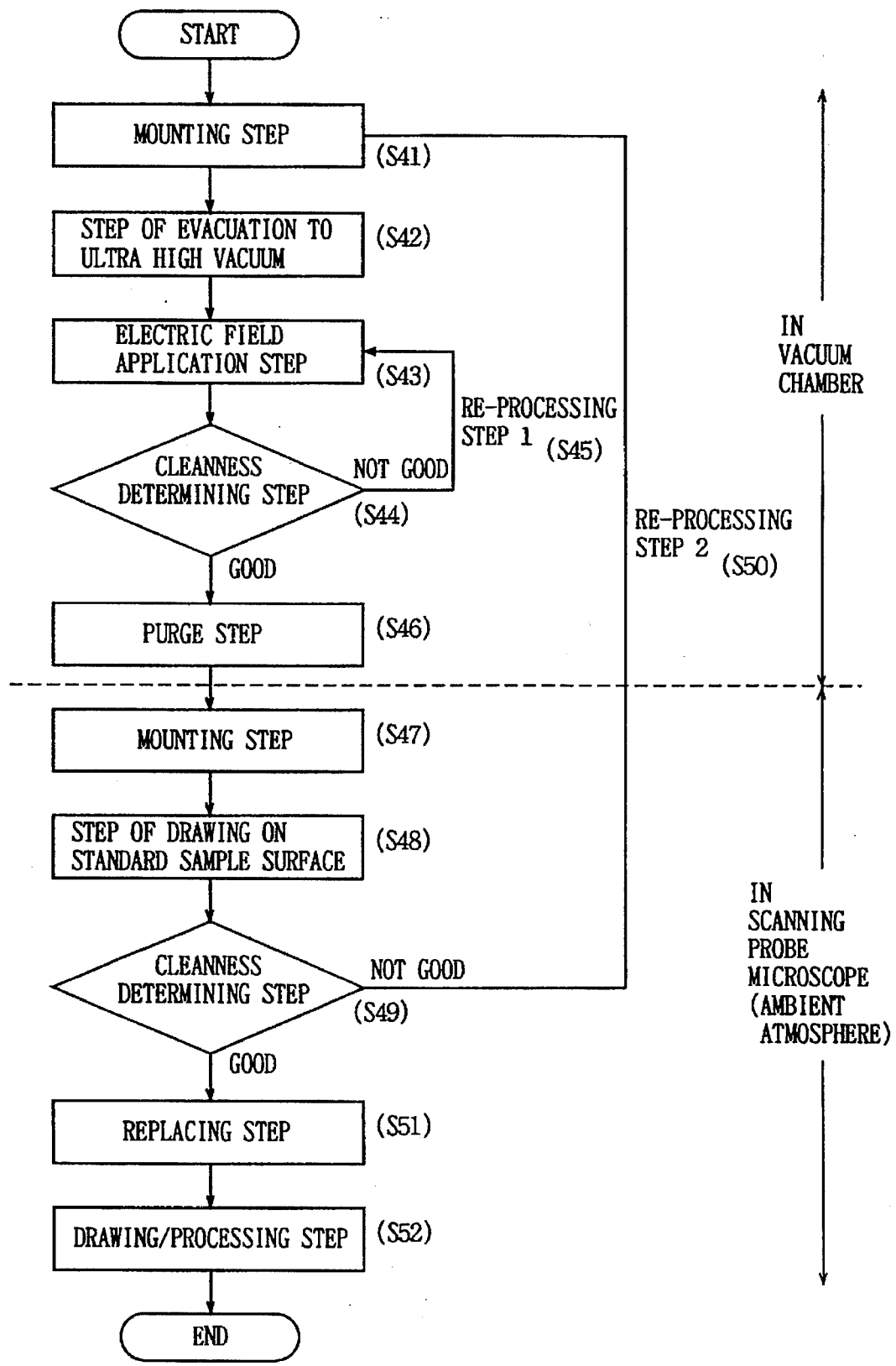
FIG. 17 is a flow chart showing the conventional method of cleaning and preparation of a probe for inspection.

FIG. 13 is a schematic block diagram showing the structure of the STM apparatus as a whole.

The tunnel current value amplified signal amplified by preamplifier 200 has its noise component removed by a filter 210.

In the following, it is assumed that position control of probe 110 in the Z direction is performed under feedback control, switch SW1 is closed and SW2 is opened.

In that case, a differential amplifier 220 receives, as one input, a reference voltage defining the constant tunnel current to be flown between standard sample 120 and probe 110, and receives, as another input, the tunnel current value amplified signal from preamplifier 200 which corresponds to the current which has actually flown to probe 110. Differential amplifier 220 outputs an Z direction control signal to a parallel circuitry including a proportional amplifier 230 and an integration amplifier circuit 240. A Z direction control circuit 260 applies a Z direction control voltage to the cylindrical piezoelectric element 140 in response to this signal. The direction of change of the Z direction control voltage value is such a direction that makes the output from differential amplifier 220 to 0, that is, to make the tunnel current corresponding to the set reference voltage always constant. More specifically, if there is too much tunnel current, the distance between the probe 110 and the sample 120 is enlarged, and if the tunnel current is too small, the distance is reduced. Meanwhile, a computer 300 drives an XY direction controlling DA converter 280 so that sample 120 mounted on a mechanism allowing fine movement consisting of cylindrical piezoelectric element 140 is two-dimensionally scanned by the X, Y direction voltage. The digital signal applied to DA converter 280 for generating the XY direction control voltage and the digital signal obtained by analogue to digital conversion through AD converter 270 from Z direction control voltage applied to the cylindrical piezoelectric element 140 are used as three-dimensional information, and utilizing this information, the topography of a prescribed region on the surface of the standard sample 120 is obtained.

(2) First Embodiment

Figure 1:
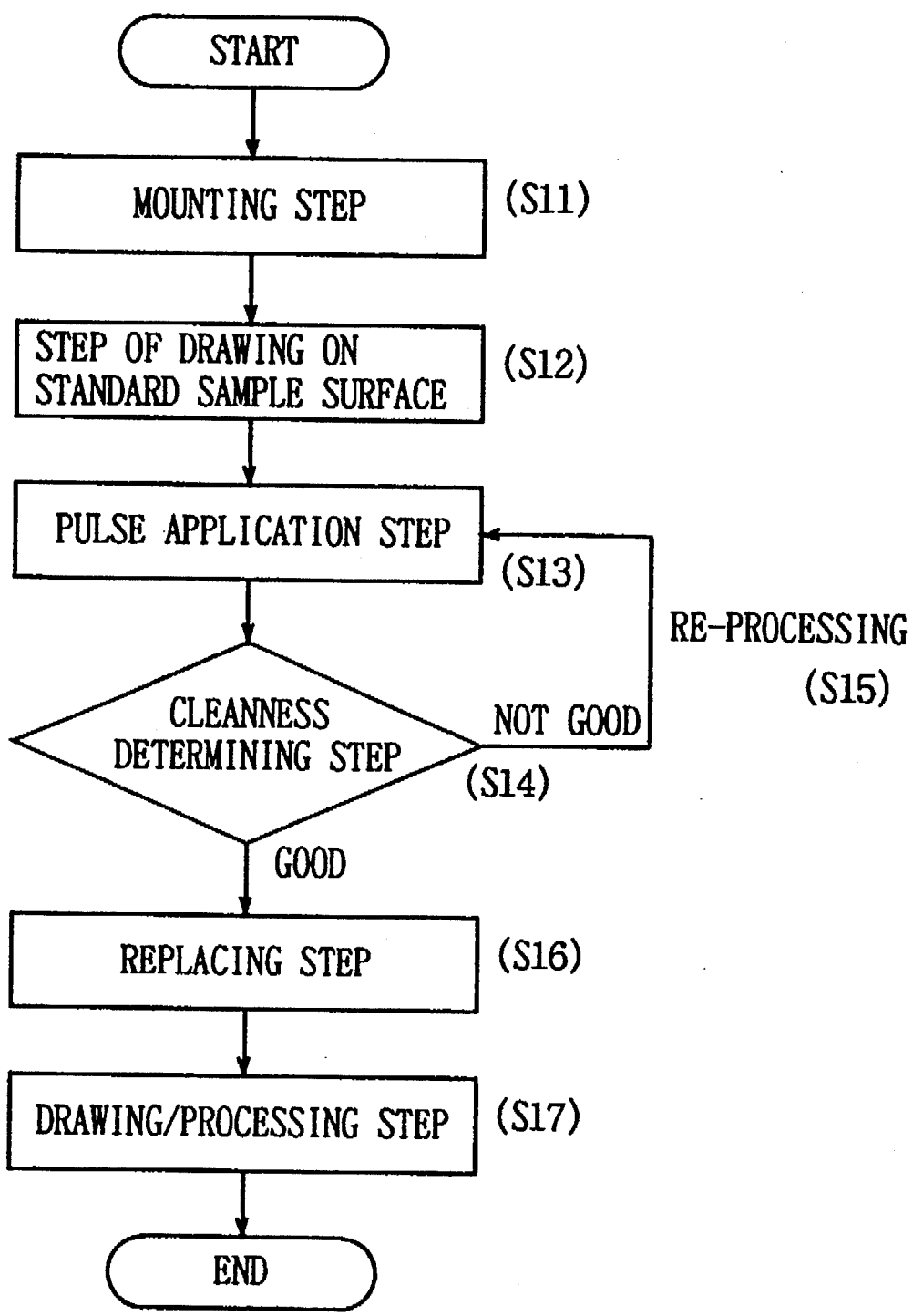
FIG. 1 is a flowchart showing the method of use of a probe microscope in accordance with a first embodiment of the present invention.

FIG. 1 is a flow chart showing the method of use of the scanning probe microscope in accordance with the first embodiment of the present invention. Description will be given with reference to the flow chart.

a) Mounting step (step S11)

First, in the mounting step S11, a conductive standard sample 120 of which atomic arrangement pattern on the surface is known and its crystal structure is known by, for example, X-ray structural analysis is fixed on one end of cylindrical piezoelectric element 140 of STM 100, and a tip of probe 110 for inspection for STM 100, which is formed of a conductive material such as metal and shaped to have the finished probe shape by mechanical or electrochemical method is mounted on STM 100 as shown in FIG. 12 opposing to the surface of standard sample 120, in ambient atmosphere.

b) Step of drawing on the surface of standard sample (step S12)

Thereafter, in the step S12 of drawing on the surface of standard sample shown in FIG. 1, a DA converter 290 is driven by a computer 300 in a control electronic circuitry shown in FIG. 13, a prescribed bias voltage is applied between the standard sample 120 and the probe 110, switch SW1 is closed, switch SW2 is opened, feedback control of electronic circuitry is turned on and scanning of the probe is performed while Z direction of the probe is controlled such that a constant tunnel current flows between the standard sample 120 and the probe 110, whereby a topography of a prescribed region is obtained.

Figure 2:
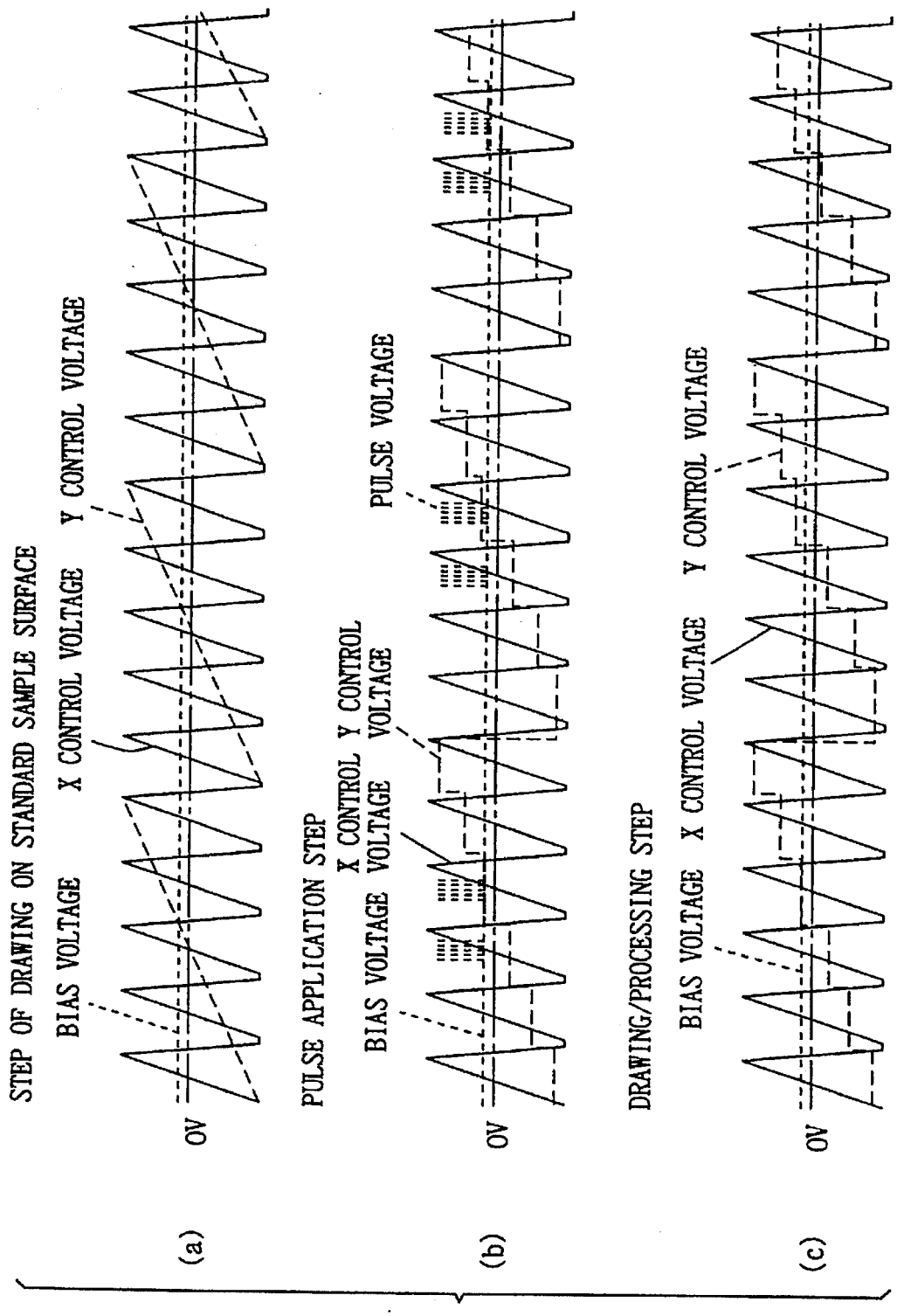
FIG. 2 is a diagram of waveforms showing time change of XY control voltage with respect to the sample table in the first embodiment in which (a) shows the waveform in the step of drawing standard sample surface, (b) shows the waveform in the step of pulse application and (c) shows the waveform of the step of drawing/processing.
Figure 4:
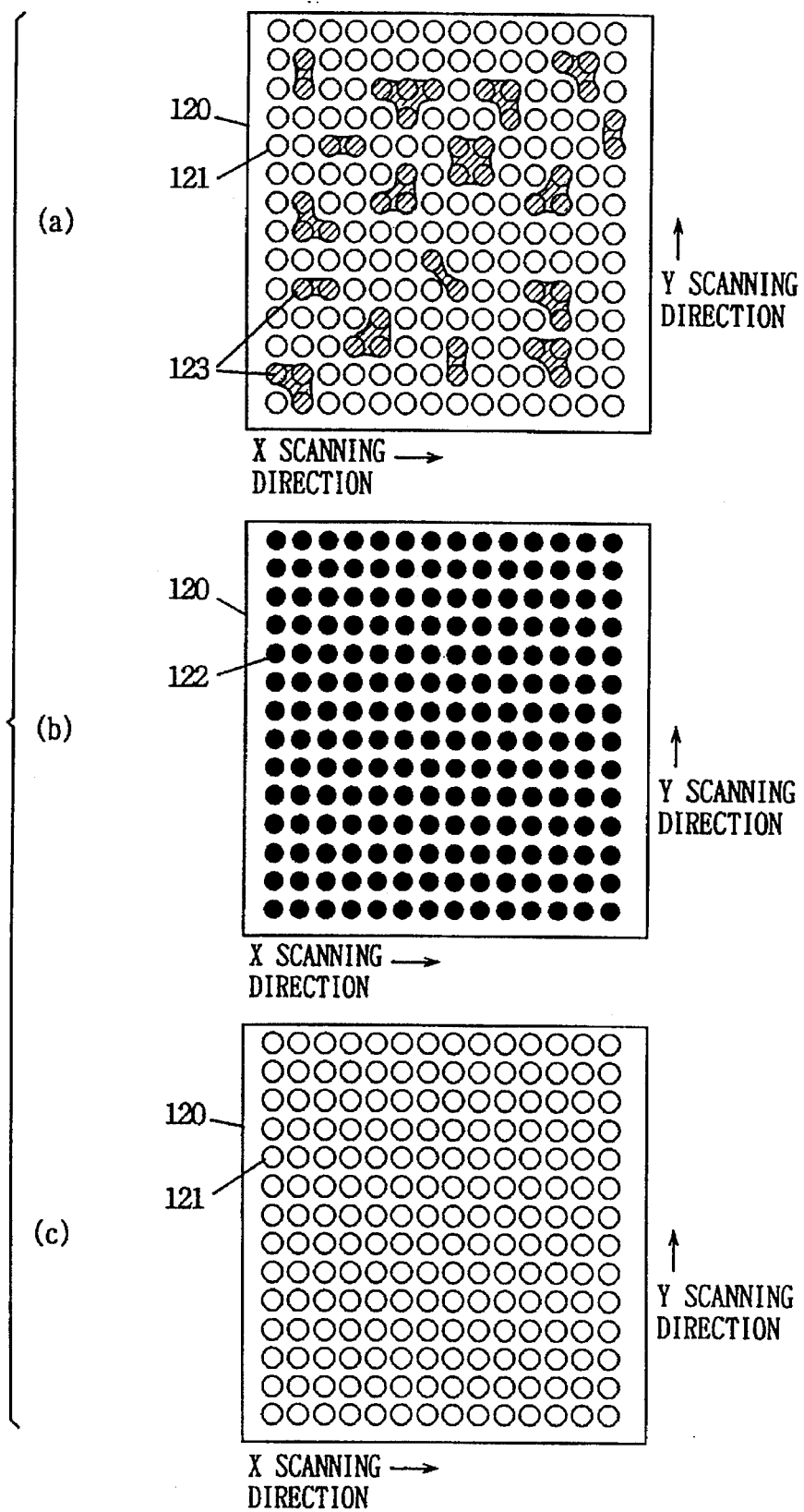
FIG. 4 schematically shows the drawn image of the first embodiment in which (a) shows the result of drawing standard sample surface, (b) shows the region on which the step of pulse application is performed and (c) shows the result of drawing in the step of determining cleanness.
Figure 5:
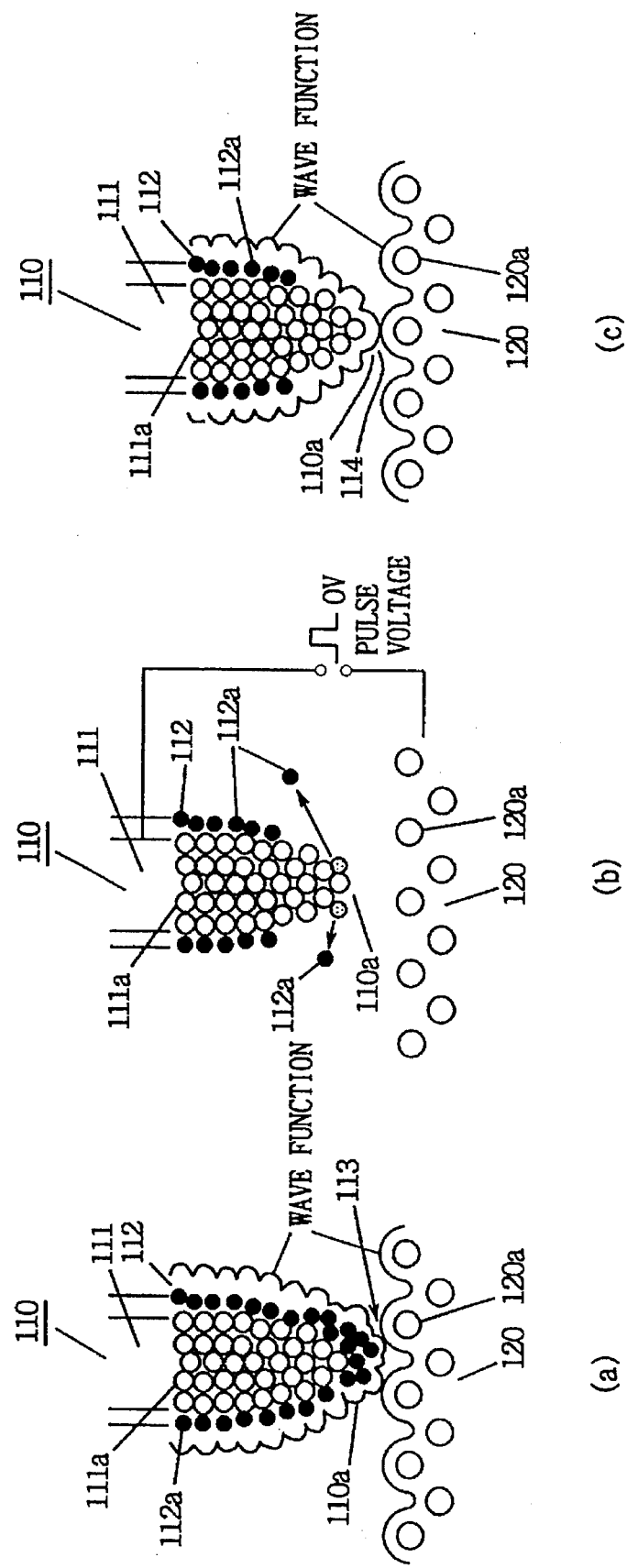
FIG. 5 schematically shows the step of cleaning the probe for inspection, in which (a) shows the state of the probe before cleaning, (b) shows the state of the probe during cleaning and (c) shows the state of the probe after cleaning.

The two-dimensional scanning in this case includes scanning of one line in the X scanning direction followed by one step of scanning in the Y scanning direction. The XY direction control voltage at this time is such a triangle wave as shown in FIG. 2(a). More specifically, in one period of Y direction control voltage denoted by the broken line, the X direction control voltage oscillates for a prescribed number of times. When there is a surface layer 112 such as a contaminated layer at the probe tip 110a as shown in FIG. 5(a) or when the arrangement of atoms 111a constituting the probe is distorted, the probe tip 110a would be a multi-atomic tip 113. Therefore, from the obtained image, the atoms 120a constituting the standard sample cannot be resolved in the atomic level, and unresolved points 120 appear in the topography, as shown in FIG. 4(a). In this case, the bias voltage is +50 mV when probe 110 is viewed from the sample 120, and the tunnel current which is to be maintained constant by the feedback is 1 nA.

c) Pulse application step (step S13)

Figure 3:
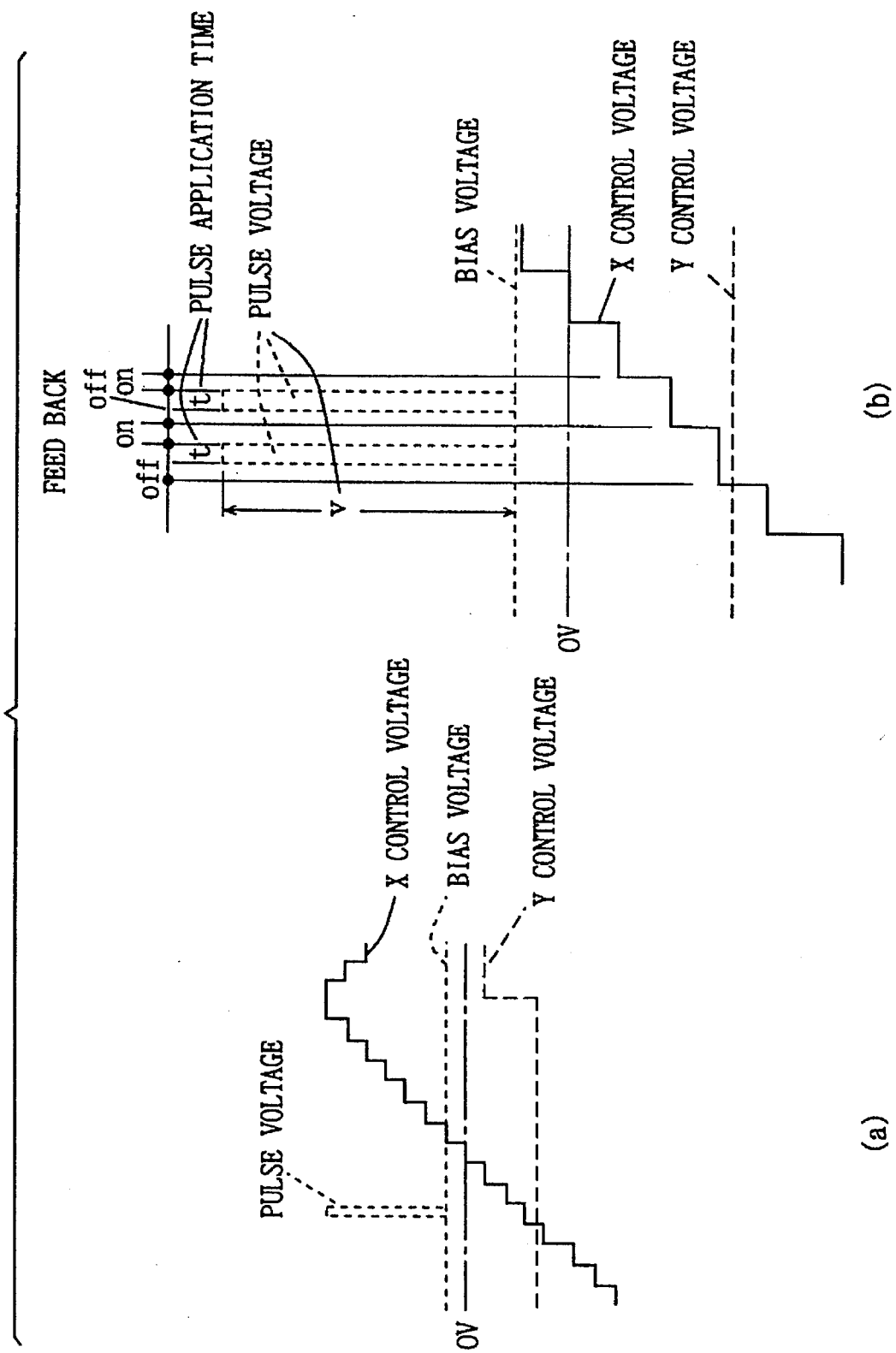
FIG. 3 is a diagram of waveforms in the step of pulse application, in which (a) is an enlargement of the waveforms in the pulse application step, and (b) is a further enlargement of (a).

In the pulse application step S13 shown in FIG. 1, switch SW1 shown in FIG. 13 is opened, switch SW2 is closed, and feedback of the control electronic circuitry is stopped in order to feed forward the scanning point of two-dimensional scanning. As shown by the time sequence of FIG. 2(b), a pulse voltage is applied instead of the bias voltage, by means of a pulse power supply 160 in DA converter 290 controlled by computer 300, between the standard sample 120 and the probe 110. FIG. 3(a) is partial enlargement of FIG. 2(b), and FIG. 3(b) is a further enlargement of FIG. 3(a). In the time sequence shown in the figure, while the X and Y direction control voltages are constant and the feedback is off, the pulse voltage is applied with constant pulse voltage V for a constant pulse application time period t.

The points at which the pulse voltage is applied, that is, pulse voltage application points 122 are denoted by black circles in FIG. 4(b), namely, the points cover the entire area in the prescribed region of standard sample 120. One measurement point.scanning point 121 (FIG. 4(a)) is regarded as a pulse voltage application point 122. When application of the pulse is completed, the standard sample 120 is moved to the next scanning point 121, and before it is used as the pulse application point 122, switch SW1 is closed, switch SW2 is opened, feedback control is activated and the original constant bias voltage is applied between the standard sample 120 and the probe 110 so as to cause constant tunnel current to flow and thus distance between the probe 110 and the standard sample 120 is returned to the constant value. In the pulse application step S13, all the measurement points·scanning points 121 of one frame are used as pulse voltage application points 122 to which pulses are applied.

d) Cleanness determining Step (step S14)

Next, in the cleanness determining step S14 shown in FIG. 1, feedback control is performed, the same bias voltage as in the step of drawing on a surface of the standard sample is applied to cause the same tunnel current to flow, while two-dimensional scanning is performed in accordance with the time sequence of FIG. 2(c) and as shown in FIG. 4(c), again, drawing to obtain a topography of the prescribed region is performed. Thus an image of one frame is obtained, which image is compared with the image obtained in the step of drawing on the surface of the standard sample. Whether the atomic arrangement pattern of standard sample 120 is drawn as an atomic arrangement pattern without any unresolved point 123 is determined, based on the shape of the pattern and on the distance between each of the atoms. If the contaminating substance at the tip of probe 110 has been removed and the tip of the probe 110 has become a mono-atomic tip 114 such as shown in FIG. 5(c) which is restructured by only one atom, an image of the atomic nucleus and the known atomic arrangement pattern of the standard sample 120 without any unresolved point 123 can be obtained.

e) Step of re-processing (step S15)

In the step of re-processing S15 shown in FIG. 1, if the atomic arrangement pattern and the distance between atoms are not the known pattern or the distance between atoms and if there is an unresolved point 123 (FIG. 4), it is determined that the tip 110a of probe 110 is not cleaned, and the step of pulse application S13 and the step of cleanness determining S14 are repeated.

f) Replacing step (step S16)

In the replacing step S16 shown in FIG. 1, the standard sample 120 fixed on one end of cylindrical piezoelectric element 140 of STM 110 is replaced by the sample 130 to be measured. Though not shown, when an atomic force microscopy (AFM) employing a conductive probe 110 having a conductive lever is used, an electric insulator may be a sample 130 for measurement.

g) Drawing/processing step (step S17)

In the drawing/processing step S17 shown in the last portion of FIG. 1, the drawing parameter conditions similar to those in said step of drawing on the surface of standard sample are changed to other drawing parameter conditions suitable for the sample 130 to be measured, if necessary. A desired region is two-dimensionally scanned in the similar time sequence as shown in FIG. 2(c), so as to draw STM image of the surface of the sample 130 to be measured, to recode image data or to perform processing on the surface of the sample 130 to be measured, such as nanometer processing or atomic manipulation necessary in the two-dimensionally scan region within the prescribed region. When AFM is used, atomic force between the sample 130 to be measured and the probe 120 is measured instead of the tunnel current in STM, feedback operation is performed based on the measured atomic force, while two-dimensional scanning is performed to obtain a topography of one frame in the prescribed region on the surface of the sample 130 to be measured, and processing such as atomic manipulation and nanometer processing is performed.

As for the two-dimensional scanning, probe 110 may be fixed on cylindrical piezoelectric element 140, the cylindrical piezoelectric element 140 may be driven by XY direction control DA converter under the control of computer 300, and the sample 130 to be measured may be two-dimensionally scanned by means of the probe 110 fixed on cylindrical piezoelectric element 140.

In the step of pulse application S13, a probe 110, for example, prepared by mechanically processing platinum-iridium alloy (80% Pt–20% Ir) having a diameter of 0.25 mm with its tip made sharp, and a standard sample 120, for example, of graphite (HOPG: Highly Oriented Pyrolytic Graphite) for X-ray diffraction or neutron diffraction are used.

Between probe 110 and standard sample 120, a pulse voltage of +2 V is applied for the pulse application time period of 20 μsec, viewed from the standard sample 120 to the probe 110, and 128×128 scanning points 121 are all used as pulse voltage application points 122. Under the pulse application condition of +2 V pulse voltage and pulse application time of 20 sec, the tip of probe 110 did not deform significantly by melting, or a mound was not formed on the surface of the standard sample 120 because of scattering of atoms 110a constituting the probe. Not a pit was formed on the surface of standard sample 120, either.

The pulse voltage and pulse application time mentioned above may be changed to appropriate pulse voltage and appropriate pulse application time which prevents formation of mound or pit when probe 110 and standard sample 120 are of different materials from those of probe 110 and standard material 120 described above.

In the step of cleanness determining S14 following the pulse application step S13, the images change from one having much unresolved points 123 caused by unsatisfactory tip of probe 110, to images of atomic arrangement pattern of graphite (HOPG) which is the standard sample 120. In this case, when bias voltage of +50 mV is applied and a tunnel current of 1 nA flows, the distance between probe 110 and standard sample 120 is maintained within 1 to 2 nm. Even when feedback is interrupted for 40 μsec, the distance between probe 110 and standard sample 120 was hardly changed, but maintained. Therefore, when the pulse voltage of +2 V is applied for 20 μsec while the feedback is stopped, there would be a high electric field between probe 110 and standard sample 120, contamination on tip 110a of the probe is removed as shown in FIG. 5(b), atoms 112a constituting the surface layer of probe are subjected to electric field evaporation, atoms 111a constituting the inner portion of the probe are subjected to re-arrangement of atoms, and it is highly possible that the tip 110a of the probe comes to be a mono-atomic chip 114 consisting of only one atom. In this case, atoms 120a constituting the standard sample can be identified one by one, and an image corresponding to the known atomic arrangement pattern and the known distance between atoms of the standard sample 120 can be drawn.

According to these embodiments, since cleaning and preparation of a probe for inspection can be performed in ambient atmosphere by fixing a conductive standard sample 120 having known surface atomic arrangement pattern and known crystal structure on STM 100 itself, a probe 110 having a mono-atomic chip 114 which enables inspection and processing of a material 130 for measurement in atomic level can be obtained at low cost without requiring any auxiliary means such as a vacuum apparatus.

(3) Second Embodiment

Figure 6:
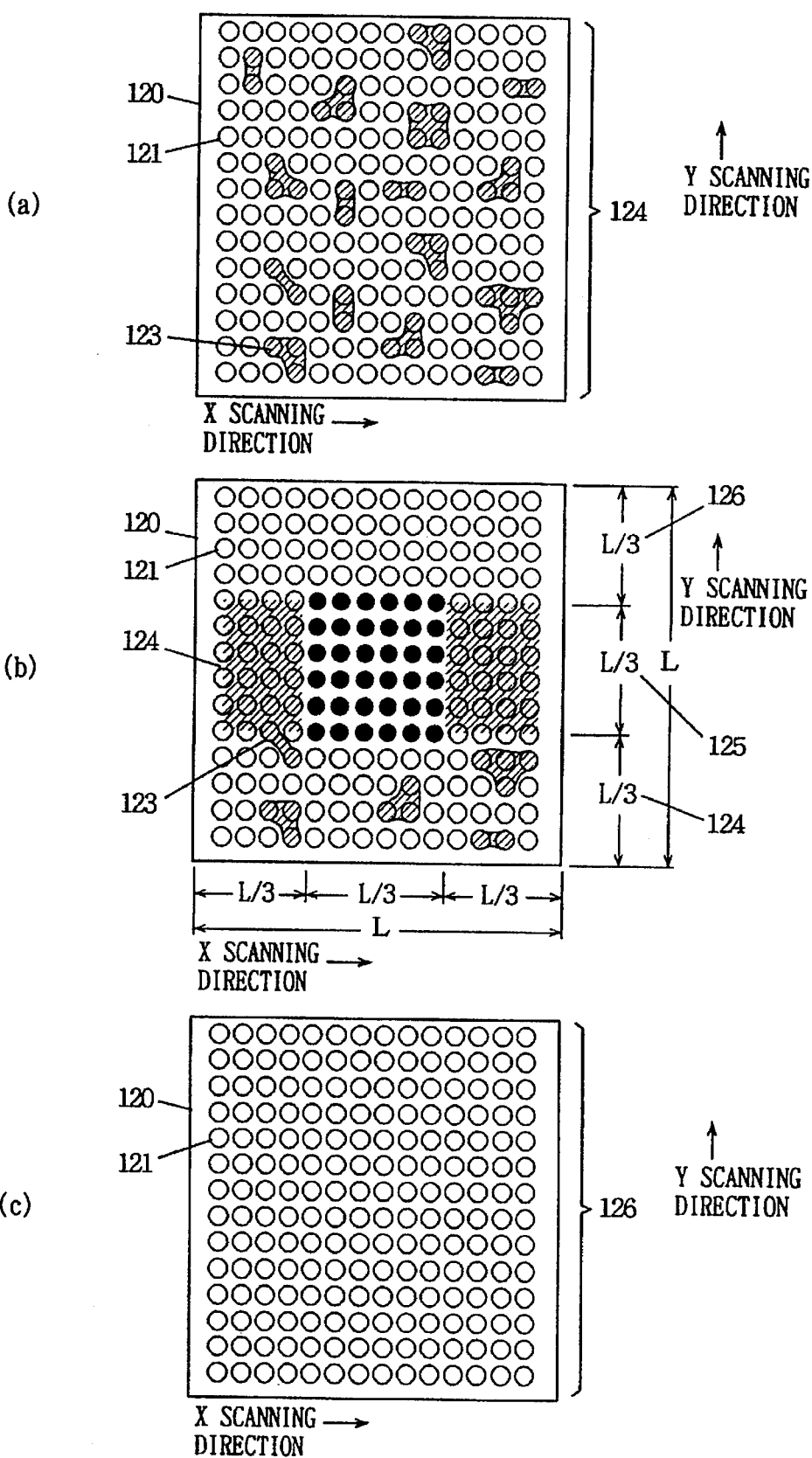
FIG. 6 schematically shows the drawn image in accordance with the second embodiment of the present invention in which (a) shows result of drawing before the step of pulse application, (b) shows the result of drawing after the step of pulse application and (c) shows the result of drawing in the step of drawing/processing.

FIG. 6 includes schematic profiles obtained by two-dimensional scanning in pulse application step S13 and drawing/processing step S17, for help understanding the pulse application step S13 in accordance with a second embodiment of the present invention.

Figure 7:
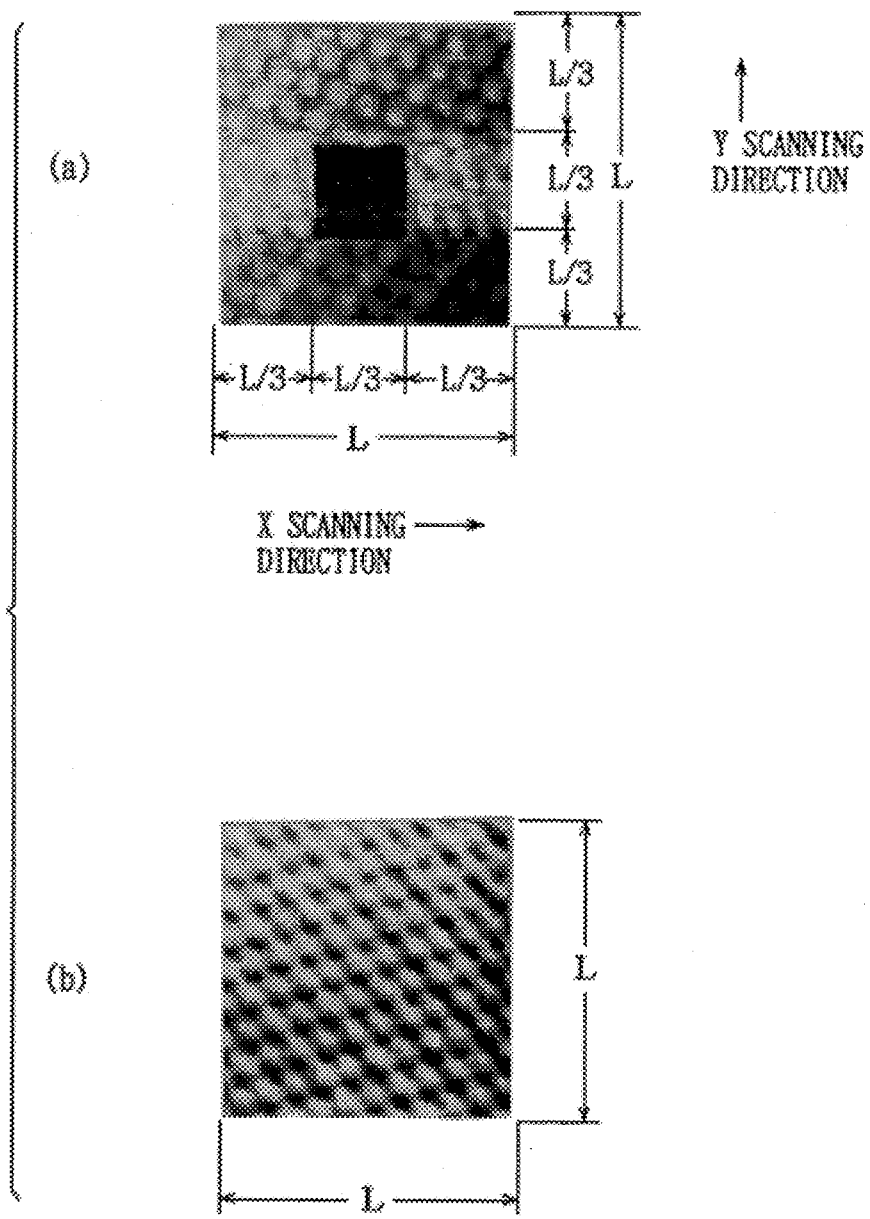
FIG. 7 is a photograph showing surface crystal structure of the result of experiment in the second embodiment, in which (a) shows the state after the step of pulse application and (b) shows the state after the step of drawing/processing.

FIG. 7 is a photograph showing surface crystal structure resulting from an experiment in accordance with the present embodiment. In pulse application step S13 in the present embodiment, referring to FIG. 6(b), the dimension of one side of pulse voltage application region 125 is about one third of the dimension L of one side of the prescribed region, and the pulse application region 125 is positioned approximately at the center of the prescribed region L×L.

If there is a surface layer 112 on the probe such as a contamination layer on probe 111 at the tip 110a or if arrangement of atoms 111a constituting the probe is in disorder, the tip portion 110a of the probe has multiple atoms 113 as shown in FIG. 5(a). Therefore, before the step of pulse application, as shown in FIG. 6(a), the image obtained in the first region corresponding to ⅓ of the Y scanning direction cannot be resolved to the atomic level of atoms 120a constituting the standard sample 120a, and hence the image includes unresolved points 123. More specifically, scanning is performed with the tip 110a of the probe having a plurality of atoms, that is, the tip of which atomic arrangement is not aligned. Therefore, the image includes not-well-resolved region 124. Here, if the first ⅓ in the Y direction of one frame for drawing is left as it is, including not-well-resolved region 124 after two-dimensional scanning without pulse application, and the next ⅓ is scanned while applying pulses, then the surface of probe 110 is cleaned and a mono-atomic chip is enabled during this period. Therefore, the remaining ⅓ region would be well-resolved region 126, as this remaining region is scanned without pulse application by the tip 110a of probe which has only one atom. Namely, the step of cleanness determining is possible simply by drawing one frame on the standard sample 120.

More specifically, by comparing an image of a portion of one frame obtained by two-dimensional scanning before pulse voltage application with the image of another portion of the same frame after pulse voltage application, whether or not the atomic arrangement pattern of the standard sample 120 is drawn can be determined, and hence whether the tip of probe 110 has been cleaned can be determined. The two-dimensional scanning at this time includes scanning of one line in the X scanning direction followed by one step in the Y scanning direction.

FIG. 7 shows the result of experiment of scanning of a 2 nm×2 nm scanning region, in which graphite (HOPG) is used as the standard sample 120. In FIG. 7(a), the region 126 scanned after the pulse application region 125 clearly presents the pattern of atoms 120a of the standard sample 120, and in FIG. 7(b) obtained by successive drawing, it is confirmed that cleaning and preparation of probe 110 for inspection were satisfactory.

In the scanning in X direction in the pulse application region 126, the pulses are not applied to scanning points 121 of the first ⅓ and the last ⅓ of one line. The reason for this is to know quickly the state of cleaning of the chip of probe 110 within one line, and to shorten the time of interruption of pulse application so as to surely recover the distance between probe 110 and standard sample 120 by feedback operation.

If cleaning and preparation of probe 110 for inspection have been completed satisfactorily, the step of pulse application S12 can be finished by the operation of computer 300 shown in FIG. 13 immediately after drawing of one frame.

According to this embodiment, it is possible to see the result of cleaning and preparation simply by drawing one frame, and hence the state of pulse application and result can be checked in a short period of time in a simple manner.

(4) Third Embodiment

Figure 8:
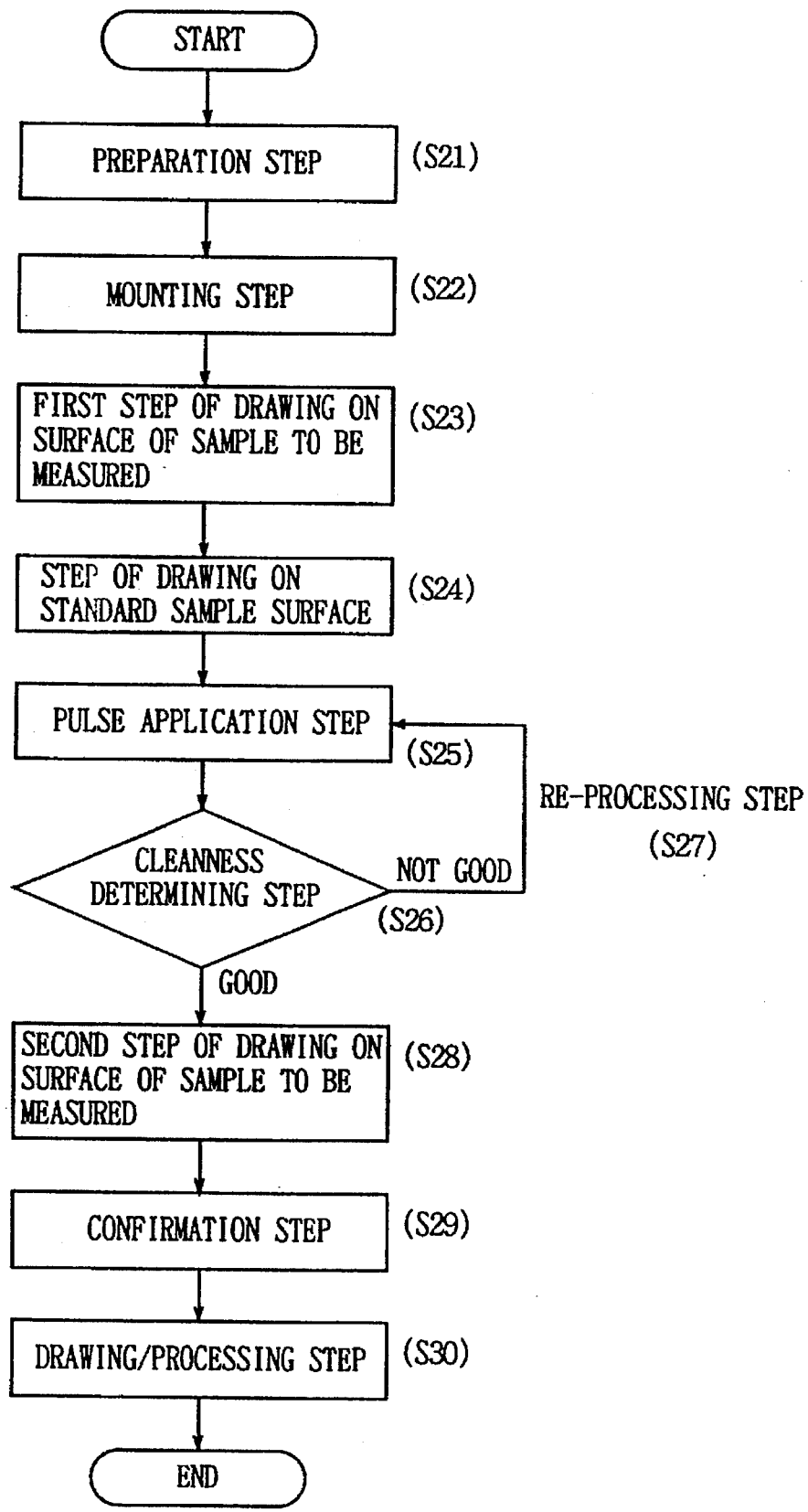
FIG. 8 is a flow chart showing the method of use of the scanning probe microscope in accordance with the third embodiment of the present invention.
Figure 9:
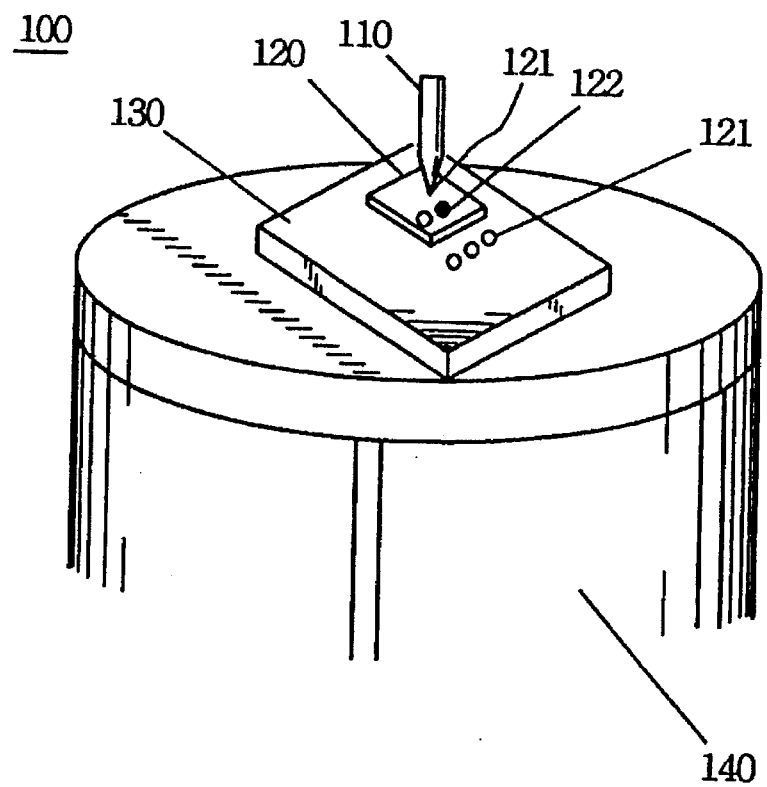
FIG. 9 is a schematic perspective view showing a main portion of the scanning probe microscope in accordance with the third embodiment.

FIG. 8 is a flow chart showing the method of use of a scanning probe microscope in accordance with a third embodiment of the present invention. FIG. 9 is a schematic perspective view of a main portion of the STM apparatus.

The method of the present embodiment will be described with reference to the flow chart.

a) Preparation step (step S21)

First, in the preparation step S21 shown in FIG. 8, a conductive standard material 120 having smaller size than sample 130 to be measured and having known atomic arrangement pattern is provided near a surface to be observed of sample 130 to be measured, as shown in FIG. 9.

b) Mounting step (step S22)

In the mounting step S22 of FIG. 8, in the similar manner as in the mounting step of the first embodiment, the sample 130 to be measured with standard sample 120 placed thereon, a conductive probe 110 which is to be cleaned, or a conductive probe 110 having a conductive lever, not shown, are mounted on STM apparatus 100 in ambient atmosphere, as shown in FIG. 9.

c) First step of drawing on the surface of the sample to be measured (step S23)

Thereafter, in the first step S23 of drawing on the surface of the sample to be measured shown in FIG. 8, physical amount between sample 130 to be measured and the probe 110, for example, tunneling current in case of STM and atomic force in case of AFM is measured, feedback of the control electronic circuitry shown in FIG. 13 is activated to keep constant said physical amount between the sample 130 to be measured and the probe 110, the sample to be measured 130 or probe 110 is two-dimensional scanned relatively, and topography of one frame of a prescribed region on the surface of the sample 130 to be measured is obtained.

d) Step of drawing on the surface of the standard sample (step S24)

In step S24 of drawing on the surface of standard sample shown in FIG. 8, first probe 110 is moved to the surface of standard sample 120. Though not shown, this movement is implemented by applying an offset voltage in the X, Y direction scanning voltages, by positioning cylindrical piezoelectric element 140 of STM device 100 on an XY fine movement stage, or by moving probe 110 by a micrometer. After this movement, topography of one frame in a prescribed region of the standard sample 120 is drawn.

e) Pulse application step (step S25)

In the pulse application step S25 shown in FIG. 8, pulse voltage is applied with all measurement points·scanning points 121 of one frame of the standard sample 120 being used as the pulse voltage application points 122.

f) Cleanness determining step (step S26)

In the cleanness determining step S26 of FIG. 8, the same bias voltage as in the step S24 of drawing on the surface of the standard sample is applied to cause the same tunnel current to flow while performing two-dimensional scanning, drawing is performed to obtain a topography of the prescribed region again and one frame of image is obtained.

The image thus obtained is compared with the image obtained in step S24 of drawing on the surface of the standard sample, and whether the probe has become clean and well prepared is checked.

g) Re-processing step (step S27)

In the step of re-processing S27, if the atomic arrangement pattern and the distance between atoms are not the same as the known pattern or the distance of atoms and if there is unresolved point 123, it is determined that the tip 110a of probe 110 has not yet been cleaned, and pulse application step S25 and checking step S26 are repeated.

h) Second step of drawing on the surface of sample to be measured (step S28)

In the second step of drawing on the surface of the sample to be measured S28 shown in FIG. 8, the probe is moved in a direction opposite to that in the step S24 of drawing on the surface of the standard sample. Namely, probe 110 is moved from the standard sample 120 to the surface of the sample 130 to be measured. Then, in the similar manner as in the first step S23 of drawing on the surface of the sample to be measured described above, two-dimensional scanning is performed with the aforementioned physical amount between sample 130 to be measured and probe 110 kept constant, using the physical amount such as tunnel current in case of STM and atomic force in case of AFM as a feedback amount, whereby topography of one frame of the surface of sample 130 to be measured is obtained.

i) Confirmation step (step S29)

In the next step of confirmation S29 shown in FIG. 8, the image obtained in the first step S23 of drawing on the surface of the sample to be measured is compared with the image obtained in the second step S28 of drawing on the surface of the sample to be measured, so as to confirm whether the tip of probe 110 has been cleaned.

j) Drawing/processing step (step S30)

Finally, in the drawing/processing step S30 shown in FIG. 8, an STM image or an AFM image on the surface of sample 130 to be measured is drawn, data is stored, or a process such as nanometer processing necessary in the region of two-dimensional scanning in the prescribed region is performed on the surface of sample 130 to be measured.

Figure 10:
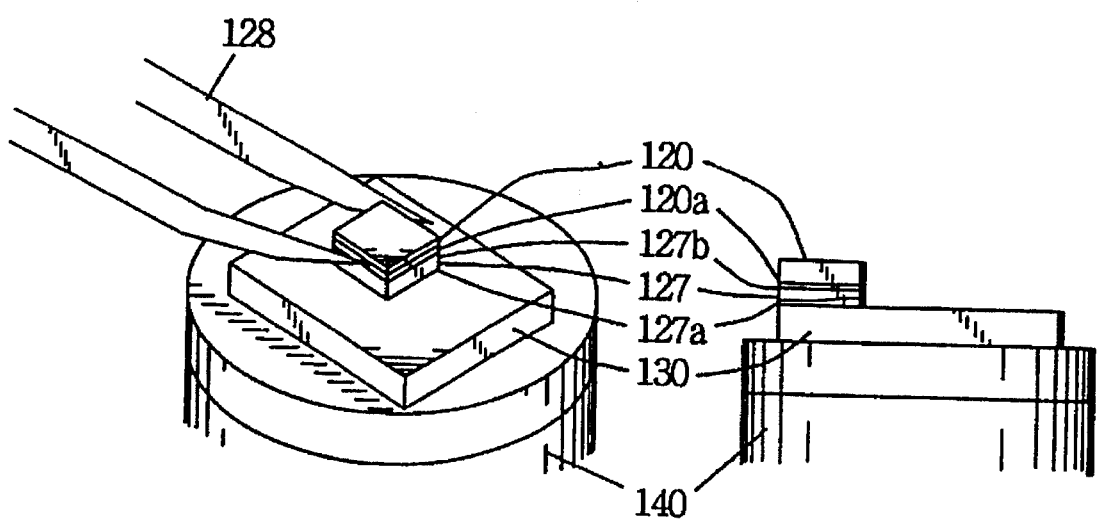
FIG. 10 is a perspective view showing the fifth embodiment of the present invention.
Figure 11:
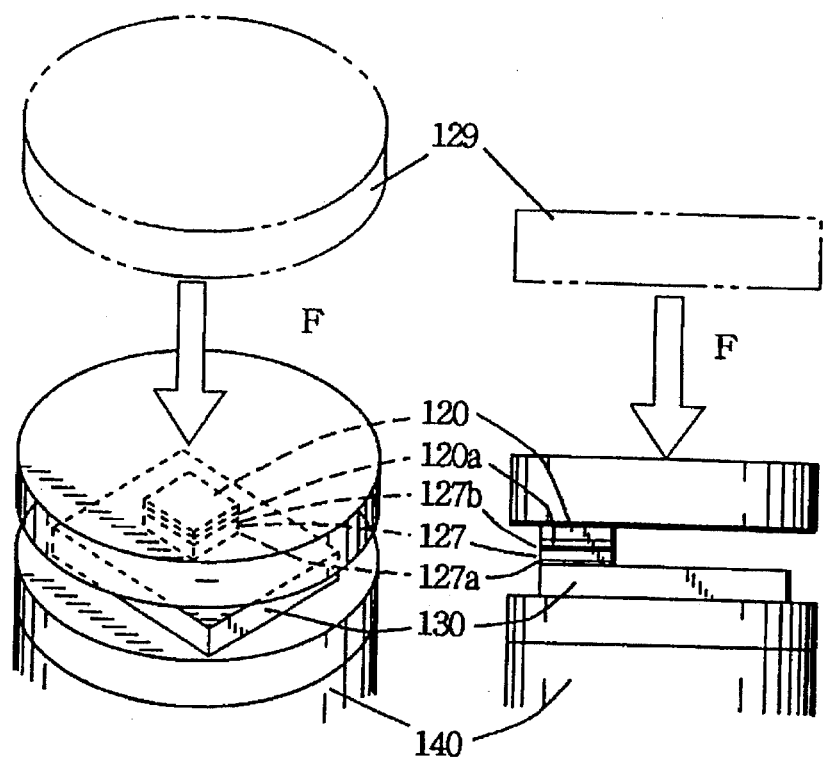
FIG. 11 is another schematic perspective view showing the fifth embodiment.

In the preparation step S21 shown in FIG. 8 of this embodiment, a standard sample 120, specially a sample 120 which can be easily cleaved is positioned near the surface to be monitored of the sample 130 to be measured, as shown in FIGS. 10 and 11. An adhesive material 127 is positioned at 127a of sample 130 to be measured, the standard sample 120 is placed on the surface 127b of the adhesive material, the standard sample 120 is pressed thereon by means of tweezers in the example shown in FIG. 10, so that the bottom surface is adhered to the surface 130 to be measured. Thereafter, the standard sample 120 is lift, and a piece of the standard sample 120 which is cleaved and separated is left on the sample 130 to be measured.

In the example shown in FIG. 11, an adhesive material 127 is interposed between standard sample 120 and sample 130 to be measured. Thereafter, upper and lower surfaces in contact with the adhesive are pinched by a parallel compressing tool 129 for pressure contact so that the samples are adhered, the standard sample 120 is lift by means of tweezers 128 as shown in FIG. 10 and a piece of the standard sample 120 which is cleaved is left on the sample 130 to be measured. An adhesive doubled coated tape may be used as the adhesive material 127.

According to this embodiment, since a conductive standard material 120 having known atomic arrangement pattern is provided near the surface to be monitored of the sample 130 to be measured, probe 110 can be easily move to the standard sample 120 or to the sample 130 to be measured simply by superimposing an offset voltage to XY control voltage, or by means of XY movement stage attached to the cylindrical piezoelectric element 140. Further, as in the first embodiment, since there is the step of pulse application between the feedback off state and feedback on state utilizing tunnel current in case of STM and atomic force in case of atomic force microscope between a conductive probe 110 or a conductive probe having a conductive lever and the conductive standard sample 120, the probe 110 which has been cleaned and well prepared can be applied not only to conductive sample 130 but also to an electric insulator.

(5) Fourth Embodiment

In the fourth embodiment, the pulse application step S25 of the third embodiment is replaced by the pulse application step S13 of the second embodiment. According to this embodiment, since the pulse application region in pulse application step S25 is a region of which side is ⅓ of the standard sample 120, and therefore the state of cleaning·preparation can be confirmed by drawing one frame, and hence the state of pulse application and result can be obtained in a short period of time in a simple manner. Further, the position of the probe 110 can be easily switched between the standard sample 120 and the sample 130 to be measured and this can be applied not only to a conductive sample 130 to be measured but also electrically insulating material.

(6) Fifth Embodiment

In the fifth embodiment, a conductive material which can be easily cleaved is used as the standard sample 120 of the first and third embodiments, so as to facilitate cleaning·preparation of probe 110.

In the first and third embodiments, graphite (HOPG) has been described as an example of the conductive standard material 120. However, it is not limited to this material, and any conductive material which can be easily cleaved may be used as the standard sample 120.

Generally, a substance which can be easily cleaved has its crystal structure known and the atomic arrangement pattern and distance between each of the atoms are well known. Therefore, it is suitable as the standard material 120 enabling precise inspection-measurement. Further, the property of easy cleavage presents additional advantage in the third embodiment, as a thin piece of the standard material 120 can be easily mounted on the sample 130 to be measured by using an adhesive material 127 applied on the sample 130 to be measured, as shown in FIG. 10.

In addition to graphite (HOPG) described above, molybdenum disulfide ($MoS_2$) may be used as the standard material 120.

Further, not only Pt—Ir alloy but also W or the like may be used for the probe 110 for inspection.

Though the embodiments of the invention have been described mainly focused on STM, the method of use of scanning probe microscope of the present invention can also be applied to general SPM such as AFM apparatus, magnetic force microscope (MFM) or the like having a conductive probe in which metal atoms are ion implanted to diamond, or having metal coverage of gold (Au) or Chromium (Cr), since what is required is to apply a pulse voltage between the conductive probe 110 and the standard sample 120 to set the probe and the sample temporarily at a high electric field, while pulse applying conditions such as pulse voltage and pulse application time are set so as not cause significant deformation of the tip of the probe 110 caused by melting and not to form mound or pit on the surface of the standard sample 120 during the step of pulse application.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of use of a scanning probe microscope including the step of cleaning in ambient atmosphere of a conductive probe for inspection, comprising the steps of:

mounting a conductive standard sample of which atomic arrangement pattern is known and said probe to be subjected to cleaning process to a scanning probe microscope in an ambient atmosphere;

applying a prescribed voltage between said standard sample and said probe and two-dimensionally scanning position of said probe relative to said standard sample while feedback controlling a distance between said standard sample and said probe so that a tunnel current is kept at a constant value, thereby obtaining a topography of a prescribed region on a surface of said standard sample;

two-dimensionally scanning position of said probe relative to said standard sample under said feedback control, stopping said feedback control every time prescribed number of sections are scanned during said two-dimensional scanning and applying at least once a prescribed pulse voltage for a prescribed time period between said standard sample and said probe, resuming said feedback control and scanning in a next section, and repeating these steps for two-dimensionally scanning the probe in said prescribed region;

two-dimensionally scanning the probe while applying same voltage as in said step of obtaining topography of the surface of the standard sample between said standard sample and said probe to cause the same tunnel current to flow under said feedback control, comparing topography thus obtained of said prescribed region and the topography obtained from said surface of the standard sample, and comparing atomic arrangement pattern thus obtained of said prescribed region with the known atomic arrangement pattern, whereby determining cleanness of the tip of said probe;

repeating said step of applying pulse voltage and said step of determining cleanness until it is determined that tip of said probe has been cleaned;

after it is determined that cleaning has been completed, placing at a position where said standard material has been set, a sample to be measured; and obtaining a topography of a prescribed region of said material to be measured under said feedback control.

2. The method of use of a scanning probe microscope according to claim 1, further comprising the step of performing processing in said prescribed region of said material to be measured by a scanning probe microscope.

3. The method of use of a scanning probe microscope according to claim 1, wherein in said step of applying pulse voltage, said prescribed region has a first region to which said pulse is applied and a second region to which pulse is not applied; and said step of determining cleanness includes the step of comparing a topography corresponding to a portion of said second region before pulse application of said second region and a topography corresponding to another portion of said second region after pulse application.

4. The method of use of a scanning probe microscope according to claim 2, wherein in said step of applying pulse voltage, said prescribed region has a first region to which said pulse is applied and a second region to which pulse is not applied; and said step of determining cleanness includes the step of comparing a topography corresponding to a portion of said second region before pulse application of said second region and a topography corresponding to another portion of said second region after pulse application.

5. A method of use of a scanning probe microscope including the step of cleaning in ambient atmosphere of a conductive probe for inspection, comprising:

the step of mounting a conductive standard material which is smaller than a sample to be measured and of which atomic arrangement pattern is known near an inspection surface of said sample to be measured;

the step of mounting the sample to be measured with the standard sample arranged near by and the probe to be subjected to cleaning process to a scanning probe microscope in an ambient atmosphere;

the first step of drawing by applying a prescribed voltage between said standard material and said probe and two-dimensionally scanning position of said probe relative to said standard sample while feedback controlling a distance between said standard material and said probe so that a tunnel current is kept at a constant value, thereby obtaining a topography of a prescribed region on a surface of said sample to be measured;

the step of two-dimensionally scanning position of said probe relative to said standard sample under said feedback control, thereby obtaining a topography of a prescribed region on a surface of said standard sample;

the step of two-dimensionally scanning position of said probe relative to said standard sample under said feedback control, stopping said feedback control every time prescribed number of sections are scanned during said two-dimensional scanning and applying at least once a prescribed pulse voltage for a prescribed time period between said standard sample and said probe, resuming said feedback control and scanning in a next step, and repeating these steps for two-dimensionally scanning the probe in said prescribed region;

the step of two-dimensionally scanning the probe while applying same voltage as in said step of obtaining topography of the surface of the standard sample between said standard sample and said probe to cause the same tunnel current to flow under said feedback control, comparing topography thus obtained of said prescribed region and the topography obtained from said surface of the standard sample, and comparing atomic arrangement pattern thus obtained of said prescribed region with the known atomic arrangement pattern, whereby determining cleanness of the tip of said probe;

repeating said step of applying pulse voltage and said step of determining cleanness until it is determined that tip of said probe has been cleaned;

the second step of drawing after it is determined that cleaning has been completed, obtaining a topography of said prescribed region on a surface of said sample to be measured; and the step of confirming cleanness of tip of said probe by comparing the topography obtained by said first step of drawing with the topography obtained by said second step of topography; and obtaining a topography of a prescribed region of said material to be measured under said feedback control.

6. The method of use of a scanning probe microscope according to claim 5, further comprising the step of performing processing by a scanning probe microscope in said prescribed region of said sample to be measured.

7. The method of use of a scanning probe microscope according to claim 5, wherein in said step of applying said pulse voltage, said prescribed region has a first region to which said pulse is applied and a second region to which pulse is not applied; and said step of determining cleanness includes the step of comparing a topography corresponding to one portion of said second region before pulse application in said second region, with a topography corresponding to another portion of said second region after pulse application.

8. The method of use of a scanning probe microscope according to claim 6, wherein in said step of applying said pulse voltage, said prescribed region has a first region to which said pulse is applied and a second region to which pulse is not applied; and said step of determining cleanness includes the step of comparing a topography corresponding to one portion of said second region before pulse application in said second region, with a topography corresponding to another portion of said second region after pulse application.

9. The method of use of a scanning probe microscope according to claim 7, wherein said standard sample is a conductive material having a property allowing easy cleavage.

10. The method of use of a scanning probe microscope according to claim 8, wherein said standard sample is a conductive material having a property allowing easy cleavage.

11. The method of use of a scanning probe microscope according to claim 5, wherein said feedback control is performed based on an atomic force between said probe and said sample to be measured, to keep constant said atomic force.

* * * * *